United States Patent [19]

Spicer

[11] Patent Number: 5,390,946
[45] Date of Patent: Feb. 21, 1995

[54] SHIFTING CLUTCH FOR DUAL-WHEEL DRIVEN BICYCLE

[76] Inventor: Eugene Spicer, 624 S. Villa Dr., Evansville, Ind. 47714

[21] Appl. No.: 88,814

[22] Filed: Jul. 7, 1993

[51] Int. Cl.⁶ .............................................. B62M 1/02
[52] U.S. Cl. ..................................... 280/259; 280/260
[58] Field of Search ................................ 280/259, 260

[56] References Cited

U.S. PATENT DOCUMENTS

| | | | |
|---|---|---|---|
| 5,004,258 | 4/1991 | Becoat | 280/259 |
| 5,116,070 | 5/1992 | Becoat | 280/259 |
| 5,158,314 | 10/1992 | Pinos | 280/259 |
| 5,224,725 | 7/1993 | Erlston | 280/259 |
| 5,253,889 | 10/1993 | Kaminski | 280/259 |

*Primary Examiner*—Mitchell J. Hill

[57] ABSTRACT

A shifting clutch to improve the constant dual-wheel driven bicycle described in U.S. Pat. No. 5,116.070. The clutch allows a dual-wheel driven bicycle to be shifted, while moving or stationary, from single to a dual-wheel drive or vice-versa. This improves the dual-wheel drive bicycle because the constant dual-wheel drive creates additional rotational resistance and the dual-wheel drive is not needed in all riding situations all of the time. The clutch is a spring-loaded hinge device that holds the rear gear assembly of the prior art. A wire is attached to the clutch frame. The wire is guided along the bicycle frame to the handlebar of the bicycle. The wire is secured to a lever on the handlebar. The bicycle rider may move the lever to pull the wire that hinges the clutch frame and the attached rear gear into a rear ring gear. This engages the dual-wheel drive mode. The bicycle rider may move the lever to release the wire tension. The spring-loaded clutch frame is then allowed to hinge outward to release the rear gear assembly from the rear ring gear to disengage the dual-wheel drive mode. The engagement and disengagement of the rear gear assembly into the rear ring gear shifts the dual wheel drive mode on and off. The shifting clutch improves the dual-wheel drive bicycle to allow it to roll as free as a single wheel drive bicycle when the dual-wheel drive mode is not needed. The dual-wheel drive mode is utilized only when the riding situation demands to allow the improved dual-wheel drive bicycle to perform better than a single-wheel drive bicycle.

1 Claim, 2 Drawing Sheets

SHIFTING CLUTCH FOR DUAL-WHEEL DRIVEN BICYCLE

BACKGROUND OF INVENTION

1. Field of Invention

This invention relates to bicycles. The invention specifically relates to dual-wheel driven bicycles.

2. Description of Prior Art

U.S. Pat. No. 5,116,070 which issued on May 26, 1992 describes how to create a dual-wheel driven bicycle using an elongated flexible shaft or cable. This cable transfers rotational force from the rear wheel to the front wheel of the bicycle.

The power is derived from driving the rear wheel, like most conventional bicycles, utilizing pedals, a pedal sprocket, a continuous chain, and rear wheel sprocket. A ring gear is attached to the hub of the rear wheel. As the rear wheel rotates, the ring gear rotates. A rear gear assembly is secured rigidly onto the rear of the bicycle frames near the rear ring gear. The rear gear assembly engages the rear ring gear. The rear ring gear drives a gear that is held in the rear gear assembly. The shaft of the rear gear assembly is attached to and rotates an elongated flexible shaft that is directed to the front of the bicycle frame. The shaft runs in a casing or similar guide. The shaft is connected to a front gear assembly. The front gear assembly is rigidly mounted onto the front fork of bicycle near the front wheel hub. A ring gear is attached to the front hub of the front wheel. A gear in the front gear assembly is rotated by the attached flexible shaft. The front gear engages and drives the front ring gear.

The following results when the rear wheel is driven. The rear ring gear rotates to engage the rigidly mounted rear gear assembly. The rear gear assembly rotates to drive the attached elongated flexible shaft. The shaft rotates the front gear assembly. The front gear assembly engages and rotates a front ring gear attached to the front hub of the front wheel. The front wheel is then rotated from the power of the rear wheel to have a constant dual-wheel drive bicycle.

The dual-wheel drive bicycle described in U.S. Pat. No. 5,116,070 requires that a roller clutch or freewheel type device be utilized in the front ring gear or front gear assembly. This is to allow the front wheel to roll independently of the flexible shaft and rear gears. This is needed since the front wheel rolls faster than the rear wheel when the bicycle is turned.

The prior art described in U.S. Pat. No. 5,116,070 may be utilized for single or multi-speed bicycles.

Through use it has been discovered that the prior an of the constant dual-wheel driven bicycle using an elongated flexible shaft, solid shaft, or a combination thereof, creates, additional rotational resistance than conventional single wheel drive bicycles. The resistance is primarily associated with the effort required by the rider to constantly rotate the elongated flexible shaft. In addition, there is constant rotational friction between the flexible shaft, its casing, and resistance associated with the effort to rotate the meshing gear assemblies.

In some riding situations, such as some off road riding and downhill maneuvering, the benefits of the dual-wheel drive system outweighs the rotational resistance problems. In other riding situations, the dual-wheel drive bicycle is more difficult to ride and the dual-wheel drive mode is not needed. The discovery that the constant dual-wheel has resistance problems, combined with the fact that the dual-wheel drive is needed in a limited number of riding situations, has created a need for the present invention. The present invention, the shifting clutch, allows the rider to engage and disengage the dual-wheel drive system at any time while riding or stationary on the bicycle. The shifting clutch allows the dual-wheel drive bicycles to roll as free as a conventional bicycle when dual-wheel drive is not needed. If the riding situation demands, then the dual-wheel drive mode can be used to truly out-perform a single wheel driven bicycle. The shifting clutch improves the prior art of the constant dual-wheel drive bicycle.

SUMMARY OF INVENTION

The present invention is a shifting clutch for the dual-wheel driven bicycle. The invention allows the prior art, a constant dual-wheel driven bicycle, to be shifted in and out of dual-wheel drive mode by the bicycle rider. The invention is intended to improve U.S. Pat. No. 5,116,070, however, it is applicable to other dual-wheel drive bicycles that use meshing gears to acquire power off of a driving rear wheel to transfer power to the front wheel.

The shifting clutch is created by mounting the rear gear of the rear gear assembly, of the prior art, onto a spring-loaded frame that has the potential to hinge in a range of motion to precisely and firmly engage and disengage the rear gear assembly into the rear ring gear to create or eliminate dual-wheel drive.

The clutch frame has a wire binder assembly that binds a wire to the clutch frame. The wire is guided through a wire guide wheel and along the bicycle frame through guides and a wire casing. The wire is attached to a lever that is secured to the handlebar of the bicycle. The rider of the bicycle pulls the lever to pull the wire to hinge the clutch and the attached rear gear assembly into the rear ring. The engaged rear gear then drives the attached flexible shaft that goes to the front gears to drive the front wheel. Releasing the lever and wire tension allows the spring-loaded clutch frame to disengage the attached rear gear assembly from the rear ring gear to disengage the dual-wheel drive mode.

According to the present invention, the clutch frame holds a hinge shaft that is attached to rod end bearings. The shaft and bearings allow proper adjustment and angle of the hinge motion. The rod end bearings are attached to split clamps to provide a means to secure the clutch frame to the bicycle frame near the rear ring gear.

Roller wheels are attached to the clutch frame that roll along adjustable guide wheels that are attached to the frame of the bicycle. The wheels and guides allow for a smooth hinge motion and lateral rigidity of the clutch frame and rear gear assembly upon engagement of the gear assembly into the rear ring gear.

Adjustable bolts through the clutch frame control the extent of the inward hinge motion as the bolts rest against the bicycle frame upon engagement. This assists the precise meshing to the gear assembly and rear ring gear.

A curved-shaped bar surrounds the outside of the clutch to protect it from the riding environment. This also provides a place to secure an adjuster to control the outward hinge motion of the clutch. A spring is attached to the curved bar to provide a manner to spring-load the clutch. The same spring is attached to the frame of the clutch. The spring provides the power to disengage the clutch when the rider releases the wire-tension at the lever on the handlebar of the bicycle.

The present invention is best suited to disengage the rear gear assembly from the rear ring gear. The result is that upon disengagement, the rear ring gear rotates along with the rear wheel without any added friction. The rear gear assembly and a flexible shaft sit motionless creating no additional rotational resistance. The front gear assembly also does not rotate because of the freewheel or roller clutch utilized in the front ring gear or front gear assembly. The freewheel or clutch rolls instead of gears and the flexible shaft. Therefore, there is no resistance from a rotating drive shaft or any of the gears. The only resistance, which is practically inconsequential, is the resistance from the freewheel or roller clutch. Upon disengagement, the dual-wheel drive bicycle rolls as well as a single wheel drive bicycle. When needed, the dual-wheel drive mode is engaged to outperform a single wheel drive bicycle.

The present invention can be utilized for single or multi-speed bicycles. The present invention is suitable for any dual-wheel drive bicycle that utilizes engaging gears to derive and transfer rotational torque from one wheel to another. As the present invention, the shifting ,clutch, becomes more known, it can be shifted by electric power. A direct current motor, batteries, and a push-button switch, known to those skilled in the art, can be combined to allow the motor to pull and push the hinged clutch frame instead of a wire, lever, and spring power.

A push-button switch, attached to the handlebar of the bicycle, would allow the bicycle rider to engage and disengage the two-wheel drive system quicker than manually moving a lever.

BRIEF DESCRIPTION OF THE DRAWINGS

Although the drawings contain several specificities, they should not be interpreted to limit the scope of the invention. The drawings merely provide illustrations of the preferred embodiments of the invention. The invention may comply with other equally effective embodiments.

DESCRIPTION OF THE PREFERRED EMBODIMENT

Figure 1:
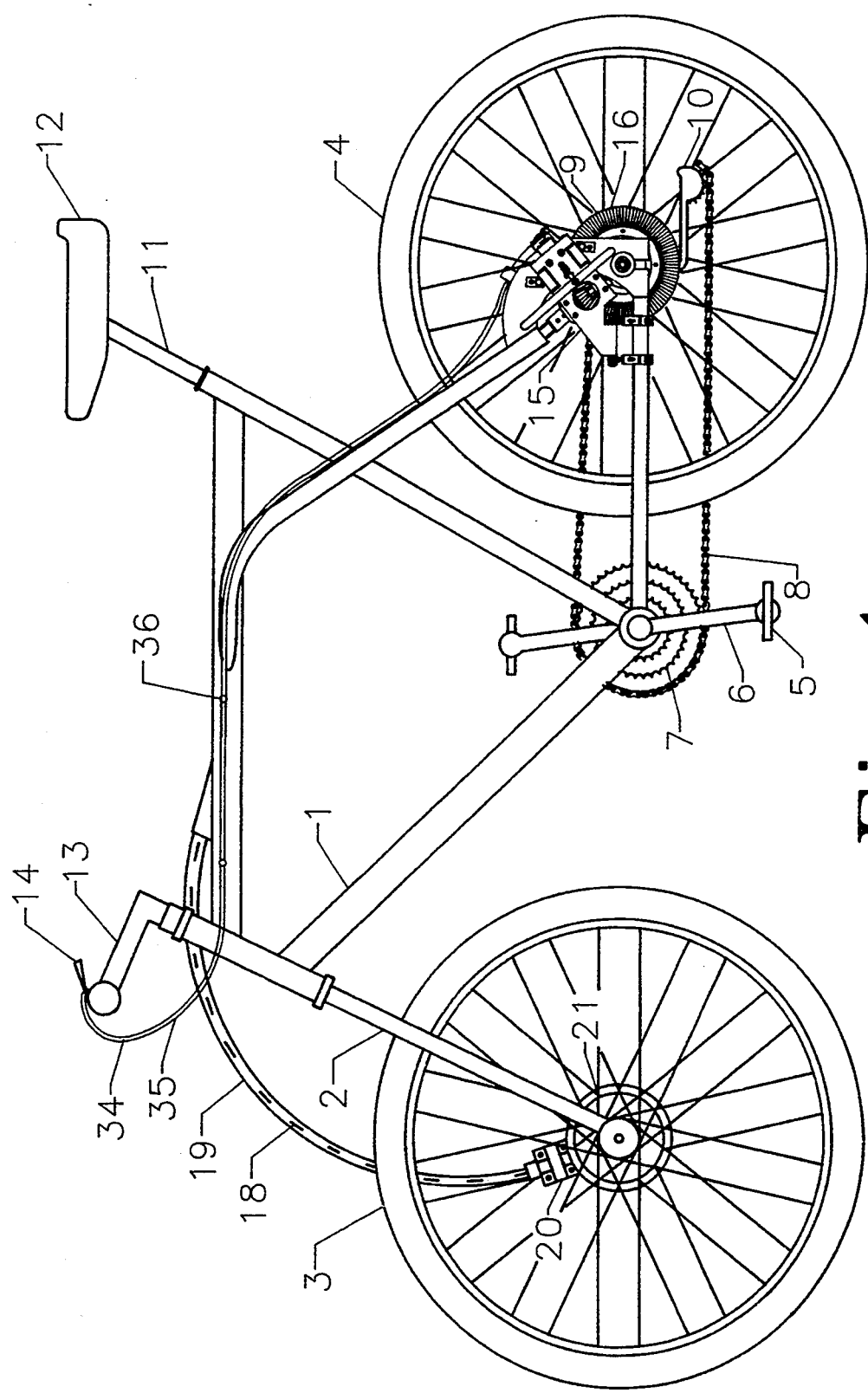
FIG. 1 a side view of a dual-wheel driven bicycle with the shifting clutch installed at the rear of the bicycle frame. The bicycle frame encloses a substantial portion of the elongated flexible drive shaft. The shaft is directed through the bicycle frame and exits at the top front of the bicycle frame and goes to the front wheel of the bicycle.

FIG. 1 is a side view of a dual-wheel driven bicycle. The bicycle frame 1 holds a fork 2 that holds a front wheel 3. A rear wheel 4 is attached to rear of bicycle frame 1. A conventional bicycle drive system known to those skilled in the art, is attached to bicycle frame 1 and rear wheel 4. The drive components include a set of pedals 5, a crank 6, a pedal sprocket 7, a continuous chain 8, a rear wheel sprocket (non-visible) 9, and a gear changer 10. The bicycle frame 1 has an attached seat post 11 and seat 12. A handlebar 13 is secured to the front of the bicycle. A clutch shift lever 14 is attached to handlebar 13.

Figure 2:
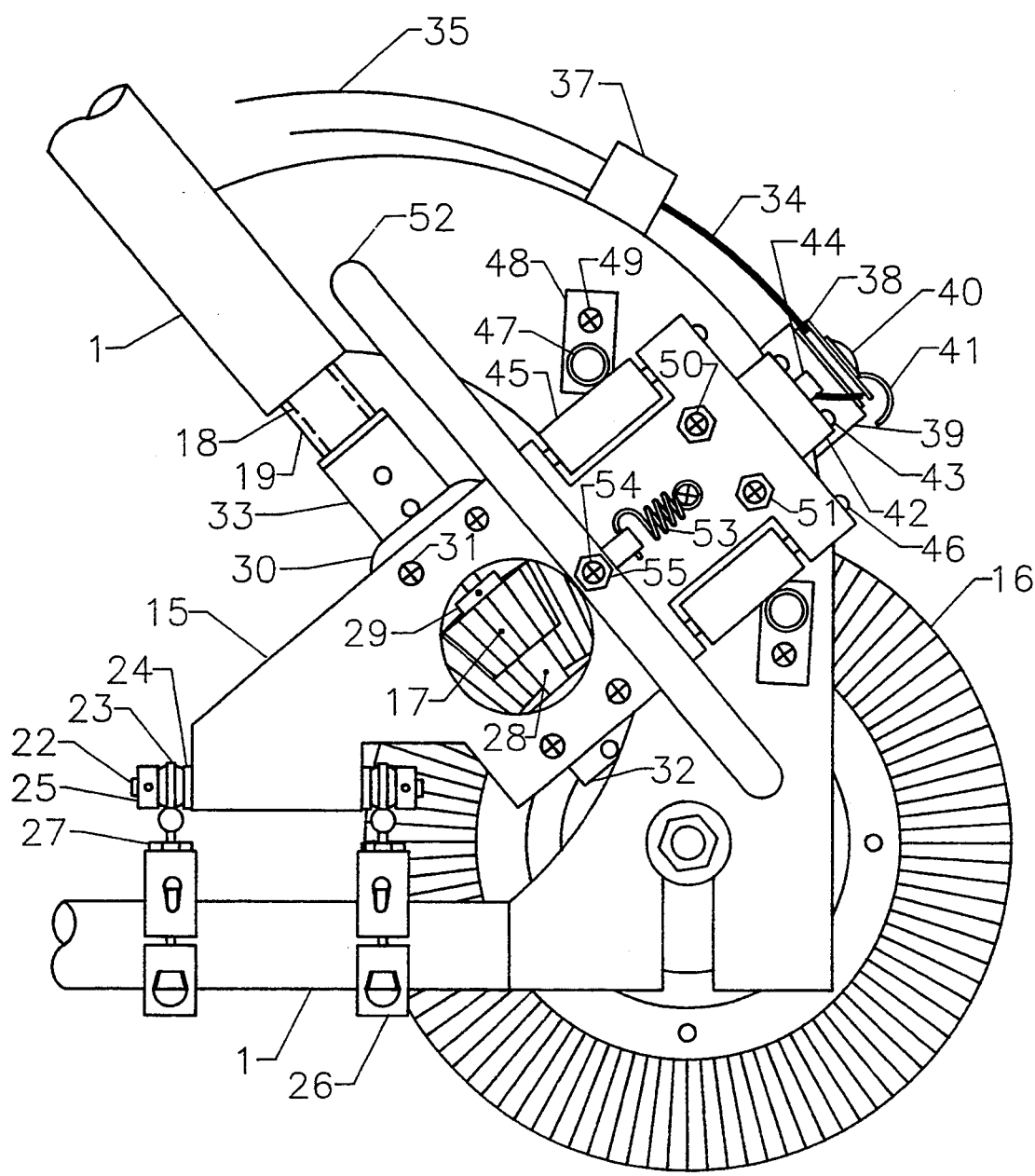
FIG. 2 is an enlarged side view of the rear section of the bicycle frame showing a side view of the installed shifting clutch. The clutch is installed near the rear ring gear.

In FIG. 1, the present invention, a shifting clutch 15, (generally referred to as a clutch or clutch frame) is utilized with the elements of the dual-wheel driven bicycle to improve the operation of the dual-wheel driven bicycle. The elements of the prior art must be discussed to describe the preferred embodiments of the shifting clutch. The dual-wheel drive components include: In FIG. 1, a rear ring gear 16 is attached to rear wheel 4. In FIG. 2, a rear gear assembly 17, mounted rigidly to the rear of bicycle frame 1 in the prior art, engages rear ring gear 16. In the present invention, the rear gear 17 is mounted upon the shifting clutch frame 15 and combined with a shaft 28 and a set of bearing blocks 30 which comprises the formally rigid mounted rear gear assembly of the prior art. The clutch 15 is the device that engages and disengages the rear gear 17 into or out of a rear ring gear 16 to turn the dual-wheel drive mode on and off. In FIG. 1, the dual-wheel drive bicycle is pedalled by the rider of the bicycle to drive rear wheel 4 (in FIG. 1 ) that rotates attached rear ring gear 16. In FIG. 2, the rear gear 16 engages rear gear assembly 17 that rotates an attached flexible shaft 18 that runs inside of a casing 19. In FIG. 1, the present bicycle frame 1 is designed to allow casing 19 to enter at the rear of bicycle frame 1 and exit at the top front of bicycle frame 1. Flexible shaft 18 is directed by casing 19 to a front gear assembly 20 that engages a front ring gear 21 attached to the hub of front wheel 3. Front wheel 3 is then driven to create a dual-wheel driven bicycle.

In FIG. 2 the shifting clutch 15, is attached to the rear of bicycle frame 1. Clutch frame 15 may be constructed of any sufficiently thick, rigid, and lightweight material such as plastic, composites, or some metals. Clutch frame 15 is bored or otherwise designed to hold a hinge shaft 22. Hinge shaft 22 enters a set of rod end bearings 23 at the end of hinge shaft 22. Rod end bearings 23 are bored balls, bored to fit hinge shaft 22, that are secured in an eyeball-like socket. This bearing is well suited to align hinge shaft 22 to hinge at a precise needed angle. A set of washers 24 are placed between clutch frame 15 and rod end bearings 23 to promote easier hinge action. A stop 25, which keeps said shaft 22 upon said rod end bearings 23. Stop 25, secured upon each end of shaft 22, may be of any clamping or set screw design that is know to those skilled in the art. Stop 25 secures shaft 22, bearings 23, and clutch frame 15 together to act as a pivot or hinge point of clutch 15. In FIG. 2, the frame of rod end bearings 23 are designed to include a male thread extension, known as male rod end bearings in the art. Thread extensions of male rod end bearings 23 are screwed into any pair of clamping devices 26 to allow said clutch frame 15 to be attached to bike frame 1 at the proper location to operate effectively. Said clamping devices 26 are best if made of a split design with two bolts at each side of said split of clamp device 26, know to those skilled in the mechanical arts, to pinch and effectively attach and conveniently remove said clutch frame 15 to bicycle frame 1. Other forms of attaching said clutch 15 to bike frame 1 include, but are not limited to, V-shaped pinching devices or brackets welded to bicycle frame 1 could also be used to secure bearings or a hinge shaft of clutch 15 to bicycle frame 1. Rod end bearings 23 may be screwed into clamping devices 26 at a range of needed heights and locked into place with a set of nuts 27 tightened upon male thread extensions of rod end bearings 23. In the preferred embodiment, split clamping devices 26 may be rotated and adjusted around the lower round tube of bicycle frame 1 to combine with the ball and socket adjustability of rod end bearings 23 to allow for a precise angle and height of the hinge motion of clutch frame 15. This hinge adjustment is a convenient and effective means for clutch frame 15 to align attached rear gear assembly 17 with rear ring gear 16.

In FIG. 2, rear gear 17 and its bearing assembly is attached to clutch frame 15 as follows: gear 17 is attached to a shaft 28 by a shear pin or bolt device 29 to hold gear 17 onto shaft 28. Shaft 28 is mounted to a pair of bearing blocks 30 attached to each side of clutch frame 15 by a series of four bolts 31. Shaft 28 is held upon bearings 30 by a shaft stop 32 and coupler 33. Coupler 33 allows shaft 28 to be connected to a flexible shaft 18 that delivers rotational torque to the front wheel 3 (FIG. 1) as usual. Rear gear 17 rolls with shaft 28 that is attached to clutch frame 15 upon bearings 30. Clutch frame 15 may hinge upon hinge shaft 22 to engage attached gear 17 into rear ring gear 16 that engages the dual-wheel drive mode.

The manner to allow the bicycle rider to engage or hinge the clutch is as follows: In FIG. 1, the clutch shift lever 14 is attached to the handlebar 13 of the bicycle. A wire 34 (non-visible at lever 14) is attached to clutch shift lever 14. Wire 34 is enclosed in a wire casing 35, wire casing 35 and wire 34 are guided from lever 14 along the bicycle frame 1 by a series of wire casing guides 36 which are small sections of tubes which are attached to said bicycle frame 1, by welding or riveting, or otherwise accomplished by those skilled in the arts, to provide a direction and control of said casing 35 and internal wire 34. In FIG. 2, a wire casing 35 enters a casing stop 37 at the rear of bicycle frame 1 near clutch frame 15. Wire 34 (now visible) exits wire casing 35 at frame stop 37. Wire 34 enters a wire guide wheel 38 to direct wire 34 to clutch frame 15 at a proper angle to pull or hinge clutch frame 15 properly. A tube or other guide and casing stop method is also suitable to guide wire 34 from wire casing 35 to clutch frame 15. Wire guide wheel 38 is attached and rolls upon a wire guide wheel base 39 that is attached to bicycle frame 1. A bolt 40 secures wire guide wheel 38 and a wire retaining loop 41 to wire wheel base 39. Wire guide wheel 38 and wire retaining loop 41 combine to allow wire 34 to be retained, guided, and moved freely. A wire binder assembly 42 is attached to clutch frame 15 by a set of bolts 43. Binder assembly 42 is bored to accept a pathway for wire 34 to enter and exit. A set screw 44 screws into binder assembly 42 to crimp or bind wire 34 as it passes through binder assembly 42. Wire 34 is attached to clutch frame 15. Several methods are suitable to clamp wire 34 to clutch frame 15. The rider of the bicycle moves clutch lever 14 to pull attached wire 34 which pulls clutch frame 15 to hinge attached gear 17 into rear ring gear 16 to engage the dual-wheel drive mode. The lever 14 may be of any friction or ratchet type lever that will retain tension upon wire 34 to maintain engagement of the dual-wheel drive mode. For example, a friction bicycle gear shift lever, gear wire, gear casing and the like, known to those skilled in the art, may be utilized.

In FIG. 2, the clutch frame must be hinged precisely and held into place laterally to allow rear gear 17 to engage rear ring gear 16 properly. This may be accomplished as follows: a set of roller wheels 45 are attached to clutch frame 15 by a set of bolts 46. Roller wheels 45 are able to rotate upon bolts 46. Roller wheels 45 must be of a material durable enough to withstand repeated rolling against a set of adjustable guide rods 47. Adjustable rods 47 are smooth and hard surfaced posts to allow roller wheels 45 to roll against. For ease of manufacture, the utilization of stripper bolts, that are known to those skilled in the art, have the required smooth-edged surface and a convenient thread at the end of the bolt. Stripper bolts or other guide rods 47 are attached or threaded into guide rod base 48 which are secured to bicycle frame 1 by base bolt 49. Base 48 should be of a durable or threadable material to support guide rods 47. Base bolts 49 are loosened to allow base 48 to rotate to adjust guide rods 47 against roller wheels 45. Base bolts 49 are tightened to secure adjustment of adjustable guide rods 49. Guide rods 47 and roller wheels 45 combined with the adjustment features of hinge shaft 22 to allow precise control of the hinge angle of clutch frame 15 and attached gear 17. Roller wheels 45 and guide rods 47 provide lateral rigidity for the clutch 15. The clutch frame 15 may hinge in and out to roll smoothly on roller wheels 45 and guide rods 47.

The extent of the inward hinge motion of clutch frame 15 must be controlled to prohibit attached rear gear 17 from binding, or inadequate meshing, with rear ring gear 16. The control of the inward hinge motion of clutch frame 15 may be accomplished as follows: clutch frame 15 is tapped, or press-fitted with thread inserts, to allow a pair of adjustable hinge stop bolts 50 to be threaded into the front of clutch frame 15 and exit at the rear of clutch frame 15. Adjustable hinge stop bolts 50 are located so as to stop against bicycle frame 1 as clutch frame 15 is hinged inward. Inward hinge stops 50 are screwed in until the inward hinge motion is limited as needed to control the extent of the inward hinge motion of clutch frame 15 and the meshing of attached rear gear 17 into rear ring gear 16. A pair of nuts 51 lock inward hinge stops 50 into place when tightened upon inward hinge stop 50 to retain the hinge stop adjustment for clutch 15. The ends of inward hinge stop 50 may be covered with rubber caps or the like material to provide a quiet stop of inward hinge stop 50 against bicycle frame 1.

The shifting clutch frame must have the potential to be released when the dual-wheel drive mode is not needed. The disengagement of rear gear 17 from rear ring gear 16 may be accomplished as follows: a curved bar 52 may be welded, bolted, or otherwise secured to bicycle frame 1 to surround the outside of clutch frame 15. One end of a spring 53 is attached to curve bar 52. The other end of a spring 53 is secured to clutch frame 15 which spring loads clutch 15. The spring 53 may be attached at each end by a bolt or loop attached to clutch frame 15 and curved bar 52. The clutch frame may be spring loaded by numerous methods. Torsion springs, known to those skilled in the art, may be utilized upon the hinge shaft 22 to spring load the clutch frame at the hinge point. The curve bar 52 also acts as a method to protect clutch 15 from riding environments. Spring 53 enables clutch frame 15 to be spring loaded. The rider of the bicycle releases tension upon wire 34 by moving clutch shift lever 14 that is attached to handlebar 13. The clutch frame 15 that is attached to wire 34 by wire binder 42 is allowed to hinge outward from spring power 53 upon the releasing of the wire tension at lever 14. Clutch frame 15 hinges at hinge shaft 23 upon roller wheels 45 and guide rods 47 to release attached gear 17 from gear 16 to release the dual-wheel drive mode by the power of spring 53.

The extent of the outward hinge motion of clutch frame 15 upon disengagement may be controlled as follows: An adjustable outward hinge stop bolt 54 is threaded into curved bar 52 that adjusts by threading in or out to control the extent of the outward hinge motion of clutch 15. The adjustment of the outward hinge stop bolts 54 is maintained by locking outward hinge stop bolts 54 by tightening a nut 55 upon outward hinge stop bolts 54. The tension of spring 53 holds clutch frame 15 out against outward hinge stop 54 when clutch 15 is disengaged. This tension of spring 53 against outward hinge stop 54 prevents clutch 15 from bouncing or rattling when the bicycle is being ridden. A soft material, such as a rubber cap, may be used to cover outward hinge stop 54 to provide a quiet disengagement of clutch 15 against outward hinge stop 54.

The clutch shift lever 14, attached to handlebar 13, is moved to pull or release wire 34 to engage or disengage clutch 15 and the dual wheel drive mode of the improved dual wheel driven bicycle.

It should be noted that the above invention may be accomplished utilizing the same concepts placed in equally effective locations near the gears of the dual wheel driven bicycle. The above invention is intended to describe the preferred embodiments of the present invention. Other embodiments may be utilized without departing the general parameters of the invention.

I claim:

1. A shifting clutch to improve the dual-wheel driven bicycle to enable the bicycle rider to engage and disengage, at any time, the dual-wheel drive mode at the rear gear assembly and rear ring gear comprising of:
   (a) a clutch attached to bicycle frame;
   (b) a pair of bearings for a shaft mounted to said clutch frame;
   (c) a shaft mounted onto said bearings; and a gear attached to said shaft
   (d) a stop attached to said shaft as a means to secure said shaft upon said bearings;
   (e) a coupling device mounted to said shaft as a means to;
     1. retain said shaft upon said bearings; and
     2. a method to attach said shaft to a flexible shaft to transfer the torque to the front wheel of the bicycle;
   (f) a hinge shaft attached to said clutch frame as a means to hinge said clutch frame;
   (g) a set of rod end bearings as a means to adjust said hinge shaft;
   (h) a pair of stops attached to said hinge shaft as a means to secure said hinge shaft to said clutch frame;
   (i) a clamping device as a means to secure said clutch frame to said bicycle;
   (j) a set of roller wheels attached to said clutch frame;
   (k) a set of guide rods attached to said bicycle frame as a means to allow said roller wheels to roll against as said clutch frame hinges inward and outward as the duel-wheel drive mode is operated on or off respectively;
   (l) a wire attached to said clutch frame;
   (m) a handlebar attached to said bicycle;
   (n) a clutch shift lever attached to said handlebar as a means to pull or release attached said wire as a means to engage or disengage said clutch;
   (o) a casing enclosing said wire as a means to direct said wire to said clutch frame;
   (p) a series of casing guides attached to said bicycle frame as a means to guide said wire enclosed in said casing to said clutch;
   (q) a casing stop attached to said bicycle frame as a means to allow said casing to stop and said wire to exit and be attached to said clutch frame;
   (r) a wire guide wheel attached to said bicycle frame as a means to guide said wire to said clutch frame;
   (s) A wire binder assembly attached to said clutch frame as a means to bind said wire to said clutch frame;
   (t) An inward hinge stop mounted to said clutch frame as a means to control inward hinge motion of said clutch frame;
   (u) A curved bar attached to said bicycle frame as a means to surround and protect said clutch frame;
   (v) A spring mounted to said curve bar and said clutch frame as a means to
     1. Spring-load spring clutch frame;
     2. To hold disengagement of said clutch frame when wire tension from said clutch lever is released; and
   (w) An outward hinge stop attached to said curve bar as a means to control extent of outward hinge motion when said clutch frame is disengaged.

* * * * *